United States Patent
Matsui

(10) Patent No.: US 10,571,914 B2
(45) Date of Patent: Feb. 25, 2020

(54) FAULT COVERAGE FOR MULTIPLE FAILURES IN REDUNDANT SYSTEMS

(71) Applicant: The Boeing Company, Chicago, IL (US)

(72) Inventor: Gen Matsui, Bothell, WA (US)

(73) Assignee: The Boeing Company, Chicago, IL (US)

( * ) Notice: Subject to any disclaimer, the term of this patent is extended or adjusted under 35 U.S.C. 154(b) by 219 days.

(21) Appl. No.: 15/637,670

(22) Filed: Jun. 29, 2017

(65) Prior Publication Data
US 2019/0004515 A1    Jan. 3, 2019

(51) Int. Cl.
| | | |
|---|---|---|
| G05D 1/00 | (2006.01) | |
| G05B 19/042 | (2006.01) | |
| B64C 13/00 | (2006.01) | |
| B64D 45/00 | (2006.01) | |
| G05B 9/03 | (2006.01) | |
| G06F 11/10 | (2006.01) | |

(52) U.S. Cl.
CPC .......... *G05D 1/0077* (2013.01); *B64C 13/00* (2013.01); *B64D 45/00* (2013.01); *G05B 9/03* (2013.01); *G05B 19/0428* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 7,877,627 | B1 * | 1/2011 | Freydel | G06F 11/182 714/11 |
| 9,327,600 | B1 * | 5/2016 | Nehmeh | B60L 1/00 |
| 2006/0167619 | A1 * | 7/2006 | Arethens | G01C 21/165 701/120 |
| 2011/0066305 | A1 * | 3/2011 | Lin | G05D 1/0077 701/3 |
| 2011/0254502 | A1 * | 10/2011 | Yount | B60L 3/0046 320/107 |
| 2014/0027564 | A1 * | 1/2014 | Mercer | B64C 13/18 244/17.13 |
| 2014/0027566 | A1 * | 1/2014 | Mercer | B64C 27/57 244/17.13 |

(Continued)

OTHER PUBLICATIONS

European Patent Office Extended Search Report, dated Nov. 19, 2018, regarding Application No. 18179925.5, 9 pages.

*Primary Examiner* — Shelley Chen
(74) *Attorney, Agent, or Firm* — Yee & Associates, P.C.

(57) ABSTRACT

A method and system for managing a control system having triple redundancy for an aircraft. The method comprises receiving a group of messages from a transmitting lane in a controller including three lanes in which a first lane failure has previously occurred. The method identifies an activity indicator, a status generated by each lane in a group of lanes, and a cyclic redundancy check value generated by each lane in the group of lanes in the group of messages. The cyclic redundancy check value generated by a lane in the group of lanes is generated using a key assigned to the lane. The method disables the controller when at least one of an anomaly is indicated in the status, an activity indicator mismatch is present, or a cyclic redundancy check value mismatch is present in the group of messages that indicates a second lane failure has occurred.

22 Claims, 6 Drawing Sheets

(56) References Cited

U.S. PATENT DOCUMENTS

| | | | |
|---|---|---|---|
| 2016/0272300 A1* | 9/2016 | Matsui | B64C 13/505 |
| 2017/0081019 A1* | 3/2017 | Lin | G05D 1/0077 |
| 2018/0237148 A1* | 8/2018 | Hehn | B64C 39/024 |
| 2018/0239665 A1* | 8/2018 | Hutton | G06F 11/1048 |

* cited by examiner

FAULT COVERAGE FOR MULTIPLE FAILURES IN REDUNDANT SYSTEMS

BACKGROUND INFORMATION

1. Field

The present disclosure relates generally to aircraft, and in particular, to fault coverage for multiple failures in redundant systems in aircraft.

2. Background

Redundancy is implemented in many systems in an aircraft to provide a desired level of performance, as well as a desire level of safety. For example, an aircraft flight control system for an aircraft includes flight control surfaces, actuators, valves, servos, controllers, and other components that are utilized to control the flight of the aircraft.

An aircraft flight control system may employ triple redundancy in the data processing architecture. This triple redundancy is employed to perform control and fault detection functions in the aircraft flight control system. In such a system, three individual computing units may perform identical or near identical computations. A computing unit is also referred to as a "lane". Often, these lanes are expected to generate identical or near identical outputs under normal conditions, and a selection is made from their computational outputs. In parallel, their outputs are typically compared for fault detection and isolation.

With a triple redundant system, "1-Fail Operative" indicates a single failure and "2-Fail Safe" indicates a dual failure. In this context, "1-Fail Operative" means that if one of the three redundant lanes in the system fails, then the system continues to operate and provides the necessary control signals to the two remaining lanes. Continued operation often follows detection and shutdown of the failed lane. This continued operation supports high integrity in a manner that reduces the possibility of an erroneous output and high availability. As a result, the system is able to continue to operate following a single lane failure.

With a triple redundant system, if another lane subsequently fails, then the computing system no longer provides the necessary output to perform a desired function. With this situation, the system may be placed into "2-Fail Safe", which is a "fail-safe" state in which control outputs from the system are no longer applied or used.

For example, with an aircraft flight control system, "1-Fail Operative" means that an actuator controlled by the system can continue to be controlled following a single lane failure. When the actuator is no longer controllable by the system with a desired level of performance, the system may be placed into a "2-Fail Safe" state in which the system is unable to control the actuator. In this state, "bypass mode" may be employed in which the actuator may be back driven by an air load or by the other actuators on the flight control surface, with low resistance.

Typically, the electronics device implemented in a lane is considered complex. For example, the components for the lane may include a microprocessor, a digital signal processor (DSP), a field programmable gate array (FPGA), or some combination thereof. As a result, all potential modes of undesired operation or the behaviors in which they are expected to fail may be more difficult to predict than desired.

Further, self-declaration of failure by a lane is not considered to have full fault coverage. Therefore, fault detection relies primarily on the comparison between the independent lanes. A first lane failure, such as determining which lane has undesired operation, is relatively simple to detect and isolate. This detection may be accomplished using majority voting.

When undesired operation of a lane is detected, that lane can be shut down by the other two lanes when those lanes agree to the shutdown. The system may continue to operate with the remaining two lanes, thus achieving a "1-Fail Operative" system. A second lane failure may also be addressed in a similar way through comparison between the two remaining lanes.

If at least one of the two remaining lanes decides that the other lane's output differs significantly from its own, the whole system can be shut down or put in an inactive state, such that a "2-Fail Safe" system is achieved. In some cases, a "2-Fail Operative" system in a triple redundant system can be achieved for limited failure cases that result in correct self-declaration.

Fault coverage for the first lane failure is relatively simple because, at the time of the first lane failure, the other two lanes are healthy. The two healthy lanes can be relied on to both agree to vote to shut down the failed lane and keeps that lane shut down, thus providing full fault coverage.

The situation becomes more complex for a situation in which a second lane failure occurs with the remaining two lanes. For example, the second lane fails and that lane votes to bring the first previously failed lane from the shutdown state, such that the first previously failed lane actively participates in the vote. As a result, the two failed lanes may take over control of the system. For example, the two failed lanes may vote to shut down the last remaining healthy lane.

Therefore, it would be desirable to have a method and apparatus that take into account at least some of the issues discussed above, as well as other possible issues. For example, it would be desirable to have a method and apparatus that overcome a technical problem with managing a control system such that a second lane failure is managed to achieve a "fail safe" system that avoids undesired operation of the system.

SUMMARY

An embodiment of the present disclosure provides a method for managing a control system having triple redundancy for an aircraft. The method comprises receiving a group of messages from a transmitting lane in a controller including three lanes in which a first lane failure has previously occurred. The method identifies an activity indicator, a status generated by each lane in a group of lanes, and a cyclic redundancy check value generated by each lane in the group of lanes in the group of messages. The cyclic redundancy check value generated by a lane in the group of lanes is generated using a key assigned to the lane. The method disables the controller when at least one of an anomaly is indicated in the status, an activity indicator mismatch is present, or a cyclic redundancy check value mismatch is present in the group of messages that indicates a second lane failure has occurred.

Another embodiment of the present disclosure provides a control system having triple redundancy for an aircraft. The control system comprises a flight control electronics system configured to receive a group of messages from a transmitting lane in a controller including three lanes in which a first lane failure has previously occurred. The control system identifies an activity indicator, a status generated by each lane in a group of lanes, and a cyclic redundancy check value generated by each lane in the group of lanes in the group of messages. The cyclic redundancy check value generated by a lane in the group of lanes is generated using a key assigned to the lane. The control system disables the controller when at least one of an anomaly is indicated in the status, an activity indicator mismatch is present, or a cyclic redundancy check value mismatch is present in the group of messages that indicates a second lane failure has occurred.

Yet another embodiment of the present disclosure provides a method for managing a control system for an aircraft. The method comprises receiving a group of messages at a flight control electronics system from a transmitting lane in a remote electronics unit including three lanes for triple redundancy in which a first lane failure has previously occurred. The method identifies, by the flight control electronics system, an activity indicator, a status generated by the transmitting lane, and a cyclic redundancy check value in the group of messages based on a key assigned to the transmitting lane. The method performs, by the flight control electronics system, an action with respect to the remote electronics unit when at least one of an anomaly is indicated in the status, an activity indicator mismatch is present, or a cyclic redundancy check value mismatch is present in the group of messages that indicates a second lane failure has occurred.

Still another embodiment of the present disclosure provides a method for managing a control system having triple redundancy for an aircraft. The method comprises receiving a group of messages from a transmitting lane in a controller including three lanes in which a first lane failure has previously occurred. The method identifies an activity indicator and an error checking data mismatch generated by a group of lanes in the group of messages based on a group of keys assigned to the group of lanes. The method disables the controller when at least one of an anomaly is indicated in the status, an activity indicator mismatch is present, or an error checking data mismatch is present in the group of messages that indicates a second lane failure has occurred.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current triple redundant systems may not handle a failure of a second lane as efficiently as desired. For example, the illustrative embodiments recognize and take account that it is undesirable to have lanes operating in an undesired manner by gaining control of a system in an aircraft. The illustrative embodiments recognize and take account that independent simple electronics devices may be used to construct a "glue-logic" to keep track of the sequence of events, such that the second failed lane cannot reactivate the first failed lane and the last remaining healthy lane would have the authority to shut down the system and place the system in a "fail safe" state. The illustrative embodiments recognize and take into account that one difficulty with this approach involves a mechanism for retaining the memory of a sequence of events that survives power cycles, without depending on complex devices which may not function as desired.

Thus, the illustrative embodiments provide a method, apparatus, and system for managing a control system. A process is present for managing a control system having triple redundancy for an aircraft. The process receives a group of messages from a transmitting lane in a controller including three lanes in which a first lane failure has previously occurred. An activity indicator, a status generated by each lane in the group of lanes, and a cyclic redundancy check value generated by each lane in the group of lanes is identified in the message. The cyclic redundancy check value generated by a lane in the group of lanes is generated using a key assigned to the lane. The controller is disabled when at least one of an anomaly is indicated in the status, an activity indicator mismatch is present, or a cyclic redundancy check value mismatch is present in the group of messages that indicates a second lane failure has occurred.

Figure 1:
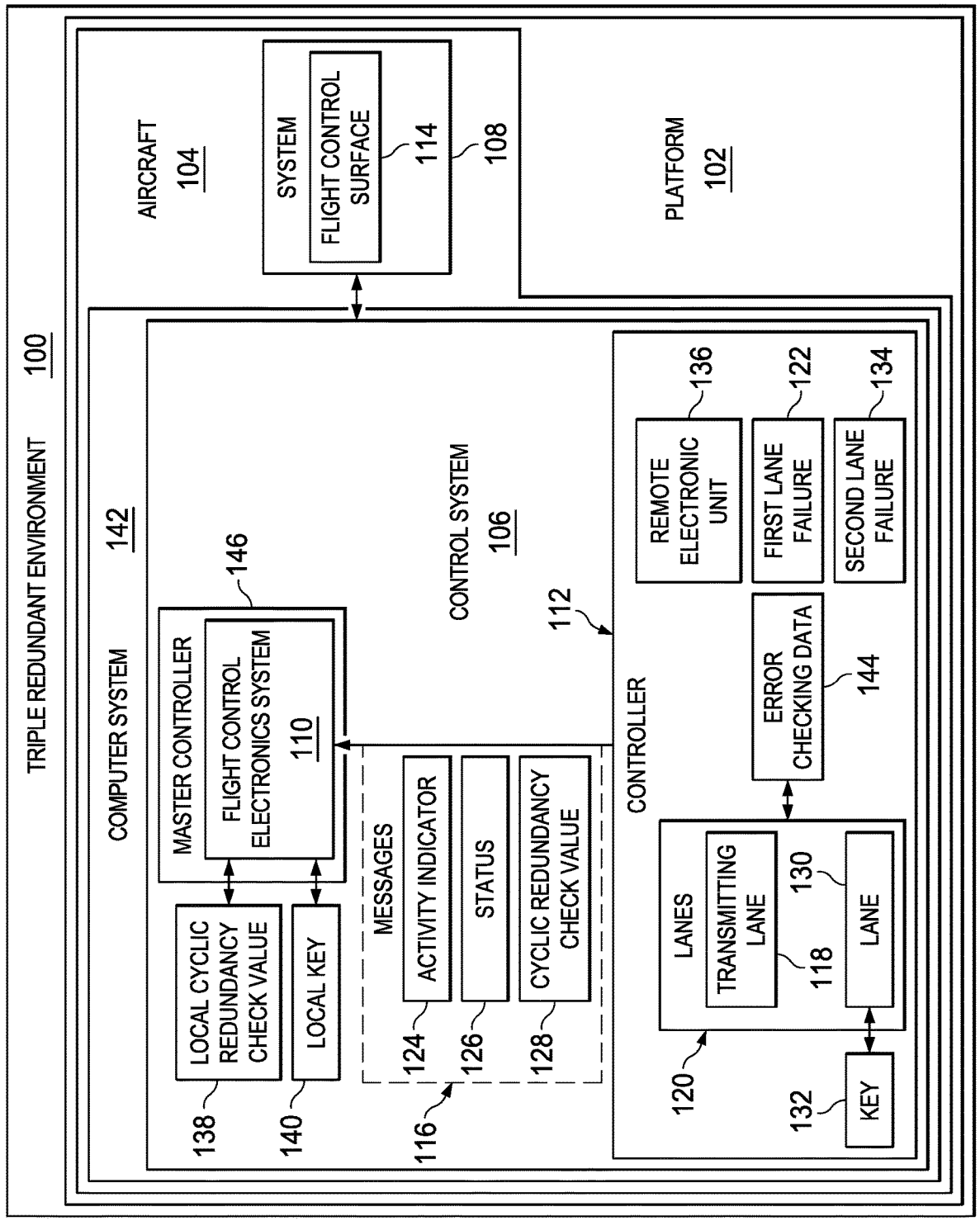
FIG. 1 is an illustration of a block diagram of a triple redundant environment in accordance with an illustrative embodiment.

With reference now to the figures and in particular reference to FIG. 1, an illustration of a block diagram of a triple redundant environment is depicted in accordance with an illustrative embodiment. In this illustrative example, triple redundant environment 100 may include platform 102 in the form of aircraft 104.

As depicted, control system 106 in aircraft 104 controls the operation of system 108. In the illustrative example, system 108 may take various forms. For example, system 108 may be selected from at least one of an actuator, a valve, a servo, a flight control surface, and in-flight entertainment system, a fuel system, an engine, an environmental control system, an auto pilot, a landing gear system, or some other suitable type of system.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C; or item B and item C. Of course, any combinations of these items may be present. In some illustrative examples, "at least one of" may be, for example, without limitation, two of item A, one of item B, and ten of item C; four of item B and seven of item C; or other suitable combinations.

In this particular example, control system 106 may be implemented in computer system 142. Computer system 142 is a physical hardware system and includes one or more data processing systems. When more than one data processing system is present, those data processing systems are in communication with each other using a communications medium. The communications medium may be a network. The data processing systems may be selected from at least one of a computer, a server computer, line replaceable units, a tablet, or some other suitable data processing system.

As depicted, control system 106 comprises flight control electronics system 110 and controller 112. In this illustrative example, controller 112 controls system 108 in the form of flight control surface 114. In the illustrative example, this control may be in direct control in which controller 112 controls an actuator connected to flight control surface 114. Flight control surface 114 may take different forms. For example, flight control surface 114 may be selected from a group comprising an aileron, an elevator, a rudder, a spoiler, a flap, a slat, an airbrake, and some other suitable type of flight control surface.

In this illustrative example, flight control electronics system 110 functions as master controller 146, while controller 112 is a lower level controller. Flight control electronics system 110 may monitor and control one or more controllers, in addition to controller 112. Those other controllers may control other flat surface controls for aircraft 104, in addition to flight control surface 114.

Controller 112 may control other systems or components in system 108 or other systems, in addition to or in place of flight control surface 114. For example, system 108 may control at least one of an actuator, a valve, a servo, an in-flight entertainment system, a fuel system, an engine, an environmental control system, an auto pilot, a landing gear system, or some other suitable component or system.

In this illustrative example, flight control electronics system 110 is configured to receive a group of messages 116 from transmitting lane 118 in lanes 120 in controller 112 that includes three lanes. As depicted, the group of messages 116 may be encrypted. As used herein, a "group of", when used with reference to an item, means one or more items. For example, a group of messages 116 is one or more messages.

In this illustrative example, first lane failure 122 has previously occurred in controller 112. During operation of control system 106, flight control electronics system 110 identifies activity indicator 124, status 126 generated by each lane in a group of lanes 120, and error checking data 144 generated by each lane in the group of lanes 120 in the group of messages 116. The group of lanes are lanes 120 that are still considered healthy or operating with a desired level of performance. In this illustrative example, error checking data 144 takes the form of cyclic redundancy check value 128.

As depicted, information may be sent in one or more messages 116. In other words, activity indicator 124, status 126 for each lane, and cyclic redundancy check value 128 for each lane may be present in a single message. For example, if two lanes are active, a single message may include activity indicator 124, two status messages, and two cyclic redundancy check values.

As depicted, cyclic redundancy check value 128 generated by lane 130 in the group of lanes 120 is generated using key 132 assigned to lane 130. In this illustrative example, cyclic redundancy check value 128 may be further based on activity indicator 124 and status 126 in the group of messages 116.

In this illustrative example, flight control electronics system 110 is configured to calculate local cyclic redundancy check value 138 for the group of messages 116 using activity indicator 124, status 126, and local key 140 for lane 130 in the group of lanes 120 in the group of messages 116. Local key 140 for lane 130 is a key assigned to lane 130 that is located at flight control electronics system 110. Local key 140 is not transmitted between flight control electronics system 110 and controller 112 when performing cyclic redundancy checks in these illustrative examples.

Flight control electronics system 110 disables controller 112 when at least one of an anomaly is indicated in status 126, an activity indicator mismatch is present, or a cyclic redundancy check value mismatch is present in the group of messages 116 received from transmitting lane 118 in controller 112 that indicates second lane failure 134 has occurred. In this illustrative example, controller 112 is remote electronic unit 136. For example, flight control electronics system 110 may disable controller 112 by removing power from controller 112.

Control system 106 and the different components in control system 106 may be implemented in software, hardware, firmware, or a combination thereof. When software is used, the operations performed by control system 106 may be implemented in program code configured to run on hardware, such as a processor unit. When firmware is used, the operations performed by control system 106 may be implemented in program code and data, and stored in persistent memory to run on a processor unit. When hardware is employed, the hardware may include circuits that operate to perform the operations in control system 106.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, one or more technical solutions are present that overcome a technical problem with managing a control system such that a second lane failure is managed to achieve a system that does not operate in an undesired manner. As a result, one or more technical solutions may provide a technical effect to more effectively detect when a lane in a controller is operating in an undesirable manner and manage that lane as compared to current techniques for redundancy in a triple redundant system.

Further, one or more technical solutions includes a master controller, such as flight control electronics system 110, that monitors the data from a lower level controller, such as controller 112, to determine whether a second lane failure has occurred in the lower level controller. In these one or more technical solutions, the master controller determines and controls actions with respect to at least one of controller 112 and system 108 controlled by controller 112.

In this manner, one or more issues with current control systems in which the controller monitors and controls the lanes within the controller may be reduced. For example, a situation may be avoided in which a previously failed lane that has been shut down may be restarted by a second failed lane, resulting in the two lanes that may operating in an undesired manner taking control of the controller and the system controlled by the controller.

As a result, computer system 142 operates as a special purpose computer system in which control system 106 in computer system 142 enables managing the control after a first lane failure has occurred. In particular, control system 106 transforms computer system 142 into a special purpose computer system as compared to currently available general computer systems that do not have control system 106.

The illustration of triple redundant environment 100 in FIG. 1 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to platform 102 in the form of aircraft 104, another illustrative example may be applied to other types of platforms. Platform 102 may be, for example, a mobile platform, a stationary platform, a land-based structure, an aquatic-based structure, and a space-based structure. More specifically, platform 102 may be a surface ship, a tank, a personnel carrier, a train, a spacecraft, a space station, a satellite, a submarine, an automobile, a power plant, a bridge, a dam, a house, a manufacturing facility, a building, and other suitable platforms.

In another illustrative example, error checking data 144 may take other forms other than cyclic redundancy check value 128. For example, error checking data 144 may be selected from at least one of parity bits, a checksum, longitudinal redundancy check values, or other types of data used to check for errors in transmitting messages, packets, or other forms of information. In other words, one or more types of error checking data 144 may be used.

As another example, status 126 may be omitted from messages 116. In some cases, error checking may be performed without sending status 126. Status 126 may be used in generating error checking data 144, such as cyclic redundancy check value 128. With this example, an anomaly and status may be detected through a cyclic redundancy check mismatch. In this example, an anomaly is present when an activity indicator mismatch for a cyclic redundancy check value mismatch is present.

In still another illustrative example, status 126 from transmitting lane 118 may be sent without error checking data 144. With this example, an anomaly is present when status 126 indicates that an activity indicator mismatch is present.

In still another illustrative example, status 126 may be sent by transmitting lane 118 without error checking and the other lane in lanes 120, other than transmitting lane 118, generates cyclic redundancy check value 128 without status 126. In this case, an anomaly is detected when an activity indicator mismatch occurs.

Figure 2:
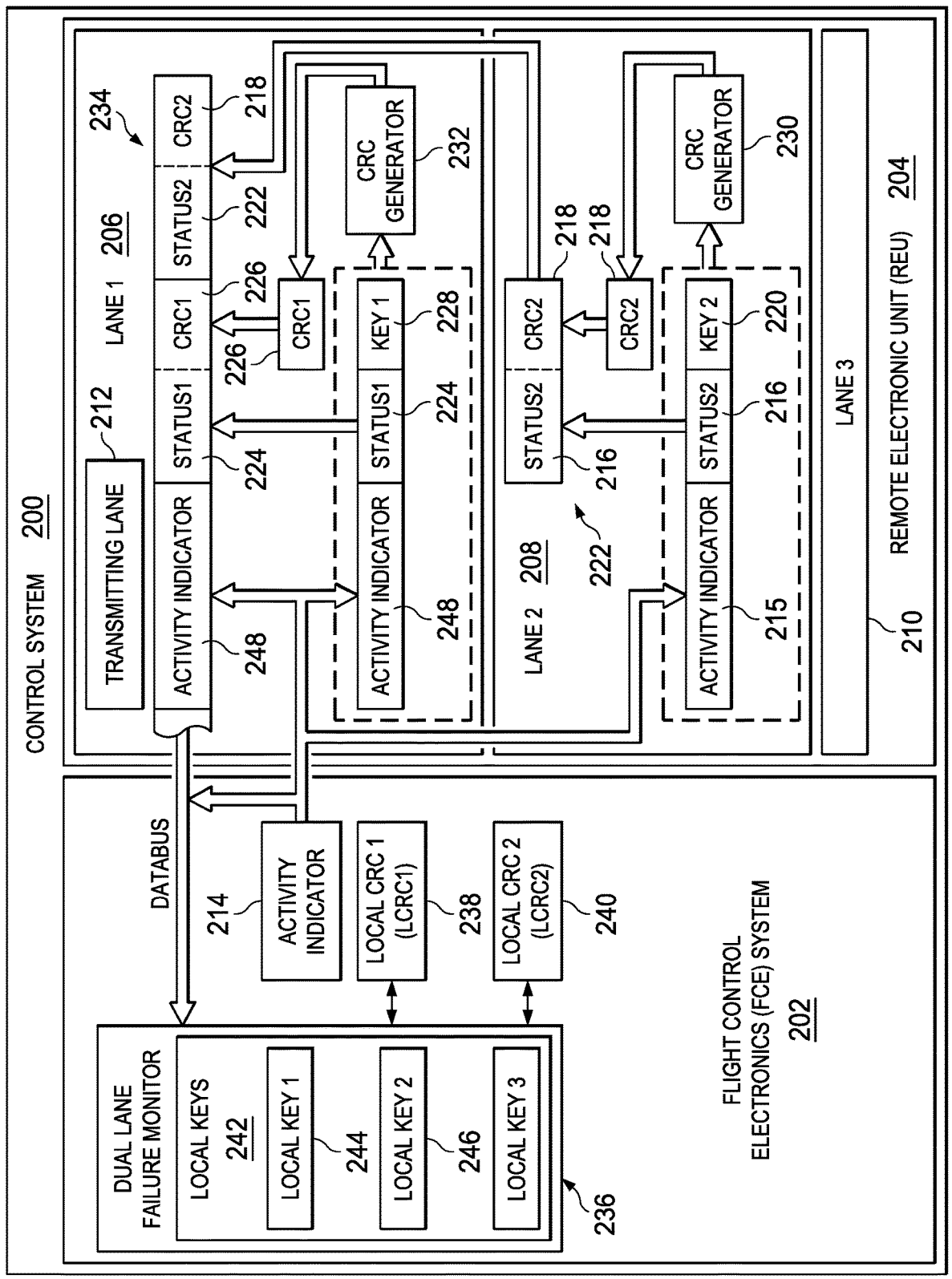
FIG. 2 is an illustration of a block diagram of a control system in accordance with an illustrative embodiment.

With reference now to FIG. 2, an illustration of a block diagram of a control system is depicted in accordance with an illustrative embodiment. In this depicted example, control system 200 is an example of one implementation for control system 106 in FIG. 1.

In this illustrative example, control system 200 includes flight control electronics (FCE) system 202 and remote electronic unit (REU) 204. Remote electronic unit 204 is an example of controller 112 in FIG. 1.

As depicted, remote electronic unit 204 includes three lanes, lane 1 206, lane 2 208, and lane 3 210. These lanes provide for triple redundancy in control system 200. As depicted, lane 1 206 is transmitting lane 212. Transmitting lane 212 communicates directly with flight control electronics system 202. The other lanes send information through transmitting lane 212.

In this illustrative example, a first lane failure has previously occurred. As depicted, lane 3 210 has failed and has been disabled. Transmitting lane 212 and lane 2 208 are the active lanes in remote electronic unit 204.

As depicted, flight control electronics system 202 generates and sends activity indicator 214 to Transmitting lane 212 and lane 2 208. In this illustrative example, activity indicator 214 is a numerical value that increases each time activity indicator 214 is generated. In the illustrative example, activity indicator 214 changes continuously during the operation of control system 200. If too much of a delay occurs in the operation of remote electronic unit 204, the returned activity indicator will not match activity indicator 214. The amount of delay that is too much may be selected based on how much delay results in an undesirable operation of remote electronics unit 204.

Lane 2 208 generate status 2 216. The status may indicate anomalies that lane 2 208 identifies. This anomaly may be for lane 2 208 or transmitting lane 212. Lane 2 208 has cyclic redundancy check (CRC) generator 230 that generates cyclic redundancy check value (CRC2) 218 using activity indicator 215, status 2 216, and key 2 220. Key 2 220 is the key assigned to lane 2 208. Lane 2 208 sends message 222 to transmitting lane 212. Ideally, activity indicator 215 should have the same value as activity indicator 214. Message 222 contains status 2 216 and cyclic redundancy check value 218.

In this illustrative example, transmitting lane 212 generate status 1 224. Status 1 224 includes indications of anomalies that transmitting lane 212 may identify for transmitting lane 212 or lane 2 208. Transmitting lane 212 has cyclic redundancy check (CRC) generator 232 that generates cyclic redundancy check value (CRC1) 226 using activity indicator 248, status 1 224, and key 1 228. Key 1 228 is a key assigned to transmitting lane 212.

Further, cyclic redundancy check generator 232 is shown as a separate component from cyclic redundancy check generator 230. In some illustrative examples, these two blocks may be combined with cyclic redundancy check values being generated by a single physical component.

As depicted, transmitting lane 212 creates and sends message 234. In this example, message 234 includes activity indicator 248, status 1 224, cyclic redundancy check value 226, status 2 216, and cyclic redundancy check value 218. Activity indicator 248 may be the same as activity indicator 214 or may be a different value.

Message 234 is sent to flight control electronics system 202. As depicted, message 234 is processed by dual lane failure monitor 236. Dual lane failure monitor 236 begins operation when a first lane fails in remote electronic unit 204. Dual lane failure monitor 236 monitors incoming messages, such as message 234, to determine whether a lane in the two remaining lanes in remote electronic unit 204 has failed.

Dual lane failure monitor 236 examines the status generated by each lane in remote electronic unit 204 to determine whether any of the statuses indicate that an anomaly or failure has occurred in transmitting lane 212 or lane 2 208. Further, dual lane failure monitor 236 also monitors for an activity indicator mismatch in which activity indicator 214 does not match activity indicator 248 in message 234.

In determining whether a cyclic redundancy check value mismatch is present, dual lane failure monitor 236 generates local cyclic redundancy check value (LCRC1) 238 for transmitting and local cyclic redundancy check value (LCRC2) 240 for lane 2 208. These values are generated using local keys 242, such as local key 1 244 and local key 2 246. Local key 1 244 is a local key for key 1 228, and local key 2 246 is a local key for key 2 220.

These local cyclic redundancy check values are compared to the cyclic redundancy check values in message 222 to determine whether a cyclic redundancy check value mismatch is present. The use of keys aid in reducing the possibility that some process for the components could generate a counterfeit status for a lane.

In the illustrative example, each lane uses activity indicator 214 to generate the cyclic redundancy check value. If new data is not passed by a particular lane or data is passed too slowly, the returned activity indicator, activity indicator 248 in message 234, will not match activity indicator 214.

If at least one of an anomaly is indicated in the status, an activity indicator mismatch is present, or a cyclic redundancy check value mismatch is present in the group of messages, a second lane failure is present. In this illustrative example, power is removed from remote electronic unit 204 when a second lane failure has been identified by dual lane failure monitor 236.

Figure 3:
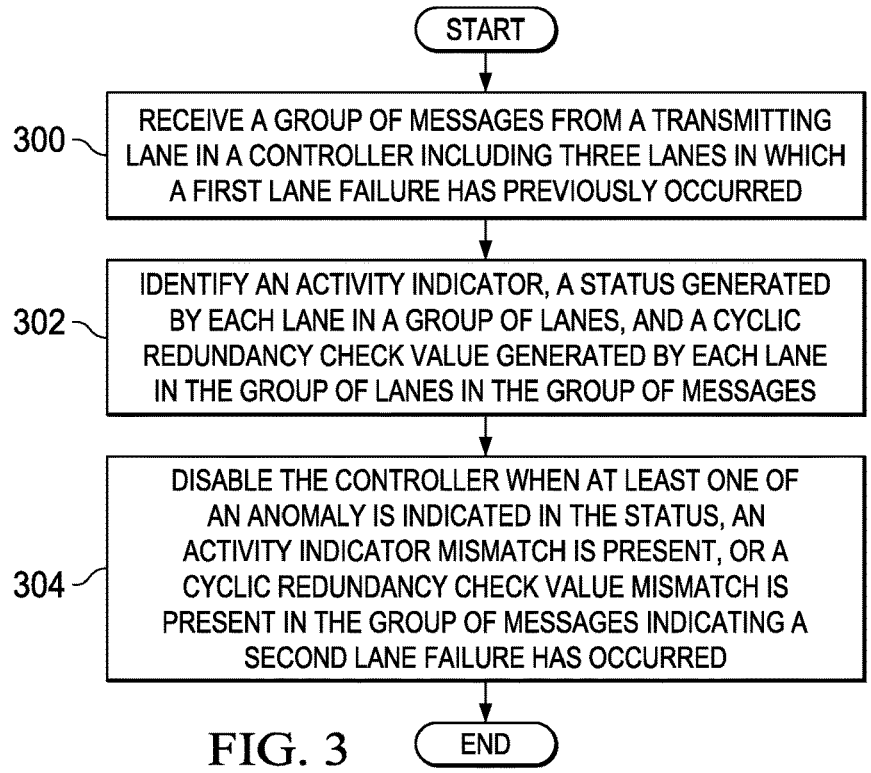
FIG. 3 is an illustration of a flowchart of a process for managing a control system having triple redundancy in accordance with an illustrative embodiment.

Turning next to FIG. 3, an illustration of a flowchart of a process for managing a control system having triple redundancy is depicted in accordance with an illustrative embodiment. The process illustrated in FIG. 3 may be implemented in flight control electronics system 110 in control system 106 in FIG. 1. The different operations illustrated in FIG. 3 may be implemented as program code, hardware, or combination thereof in a data processing system used to implement a flight control electronics systems, such as computer system 142 in FIG. 1.

The process begins by receiving a group of messages from a transmitting lane in a controller including three lanes in which a first lane failure has previously occurred (operation 300). The process identifies an activity indicator, a status generated by each lane in a group of lanes, and a cyclic redundancy check value generated by each lane in the group of lanes in the group of messages (operation 302). The cyclic redundancy check value generated by a lane in the group of lanes is generated using a key assigned to the lane.

The process disables the controller when at least one of an anomaly is indicated in the status, an activity indicator mismatch is present, or a cyclic redundancy check value mismatch is present in the group of messages, indicating a second lane failure has occurred (operation 304). The process terminates thereafter.

Figure 4:
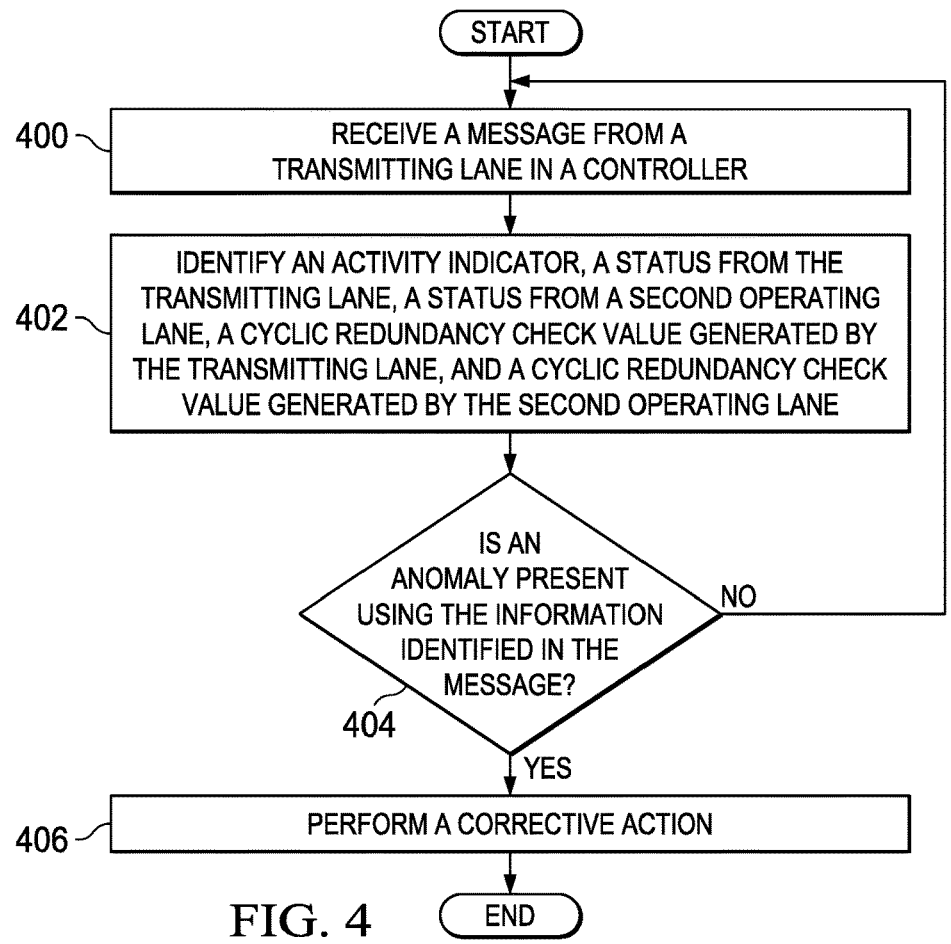
FIG. 4 is an illustration of a flowchart for process for monitoring lanes in accordance with an illustrative embodiment.

With reference now to FIG. 4, an illustration of a flowchart for a process for monitoring lanes is depicted in accordance with an illustrative embodiment. The process illustrated in FIG. 4 may be implemented in flight control electronics system 202 in control system 200 in FIG. 2. This process may also be implemented in dual lane failure monitor 236 in flight control electronics system 202 in control system 200 in FIG. 2. The different operations illustrated in FIG. 2 may be implemented as program code, hardware, or combination thereof in a data processing system used to implement a flight control electronics system, such as computer system 142 in FIG. 1.

The process begins by receiving a message from a transmitting lane in a controller (operation 400). The process identifies an activity indicator, a status from the transmitting lane, a status from a second operating lane, a cyclic redundancy check value generated by the transmitting lane, and a cyclic redundancy check value generated by the second operating lane (operation 402). The process determines whether an anomaly is present using the information identified in the message (operation 404). In this illustrative example, an anomaly is present, in this example, when at least one of an anomaly is indicated in the status, an activity indicator mismatch is present, or an error checking data mismatch is present in the group of messages.

If an anomaly is present, the process performs a corrective action (operation 406), with the process terminating thereafter. This corrective action may take various forms. For example, the process may remove power from the controller, disconnect the controller from a communications bus, shut down the controller, reboot the controller, or take some other action.

With reference again to operation 404, if an anomaly is absent, the process returns to operation 400. With this process, the controller is relieved of the responsibility for placing the controller into a "fail safe" mode.

Figure 5:
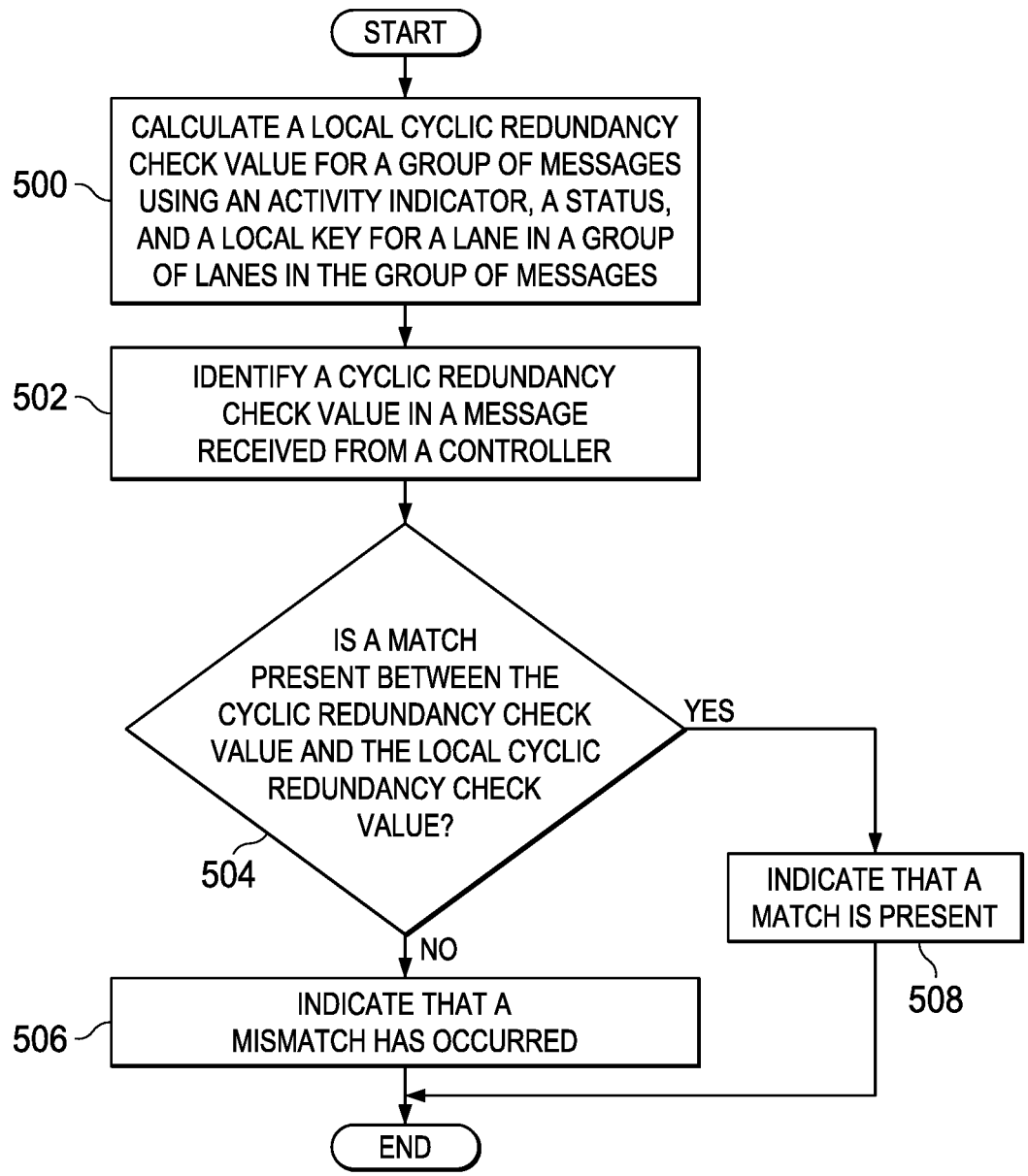
FIG. 5 is an illustration of a flowchart of a process for determining whether a cyclic redundancy value mismatch is present in accordance with an illustrative embodiment.

With reference now to FIG. 5, an illustration of a flowchart of process for determining whether a cyclic redundancy value mismatch is present is depicted in accordance with an illustrative embodiment. The process illustrated in FIG. 5 may be implemented in flight control electronics system 110 in control system 106 in FIG. 1. The different operations illustrated in FIG. 5 may be implemented as program code, hardware, or combination thereof in a data processing system used to implement a flight control electronics system, such as computer system 142 in FIG. 1.

The process begins by calculating a local cyclic redundancy check value for a group of messages using an activity indicator, a status, and a local key for a lane in a group of lanes in the group of messages (operation 500). The local key is a key located in flight control electronics system 110 in FIG. 1. The local key is not transmitted in any communications between flight control electronics system 110 and controller 112 during normal operation of aircraft 104 shown in FIG. 1.

The process identifies a cyclic redundancy check value in a message received from a controller (operation 502). A determination is made as to whether a match is present between the cyclic redundancy check value and the local cyclic redundancy check value (operation 504). If a match is not present, the process indicates that a mismatch has occurred (operation 506), with the process terminating thereafter. Otherwise, the process indicates that match is present (operation 508), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

Figure 6:
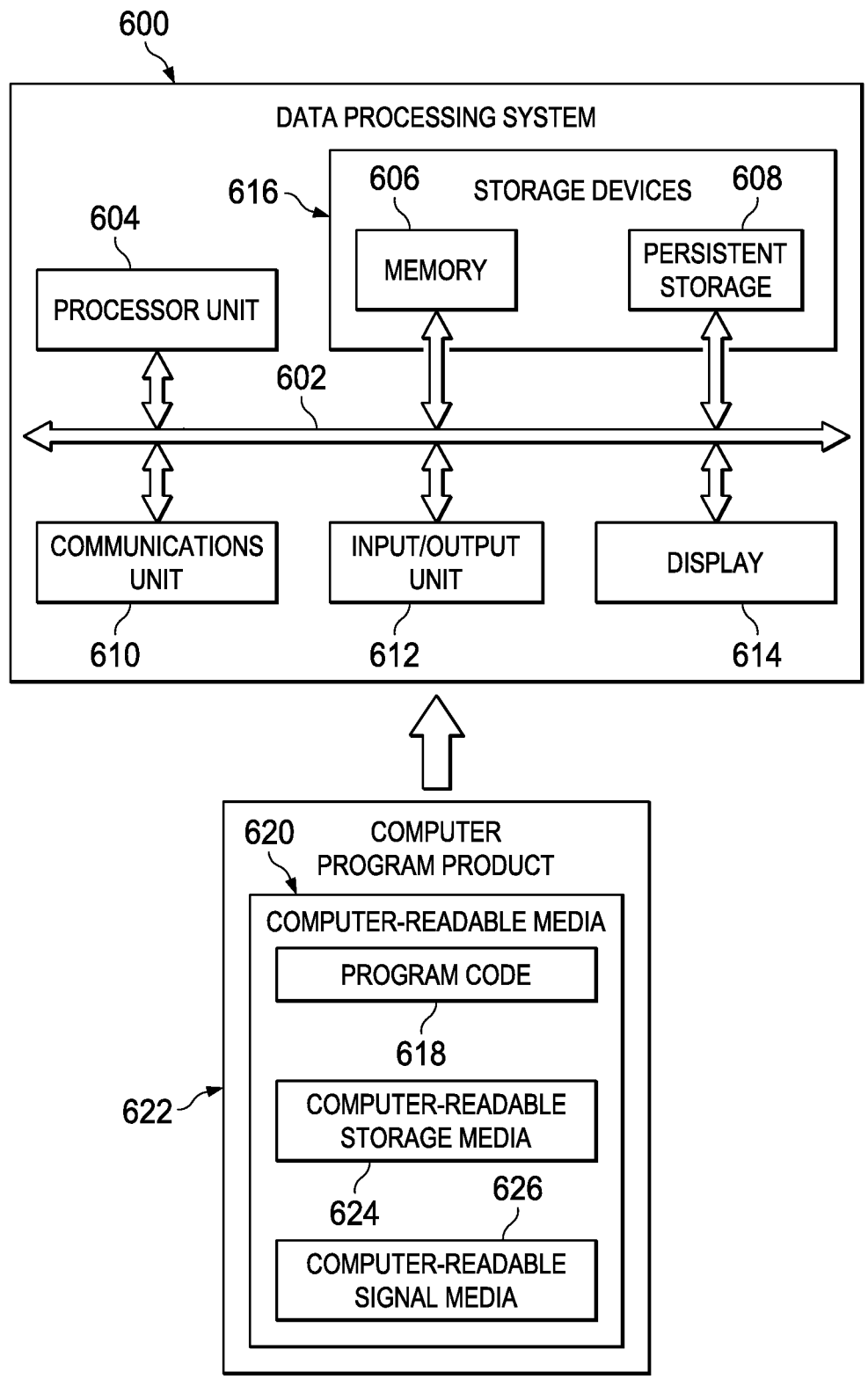
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement computer system 142 in FIG. 1. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random-access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618.

Alternatively, program code 618 may be transferred to data processing system 600 using computer-readable signal media 626. Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, an optical fiber cable, a coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Figure 7:
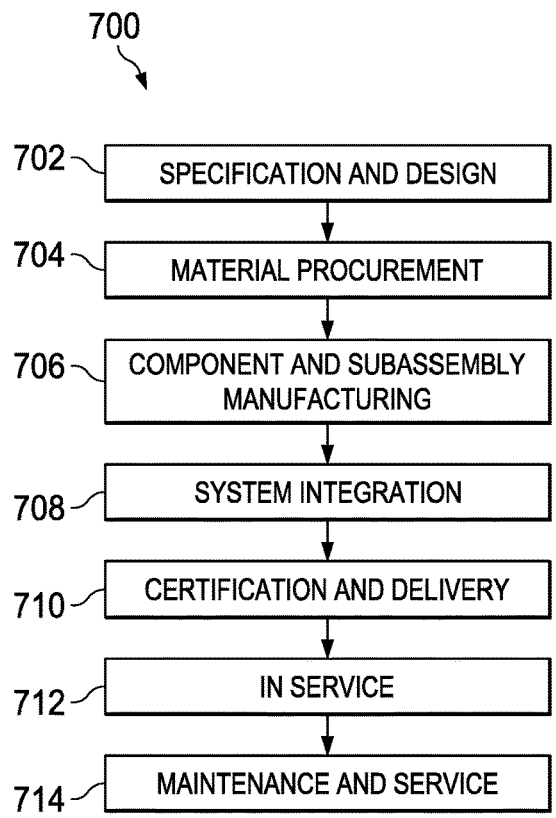
FIG. 7 is an illustration of a block diagram of an aircraft manufacturing and service method in accordance with an illustrative embodiment.
Figure 8:
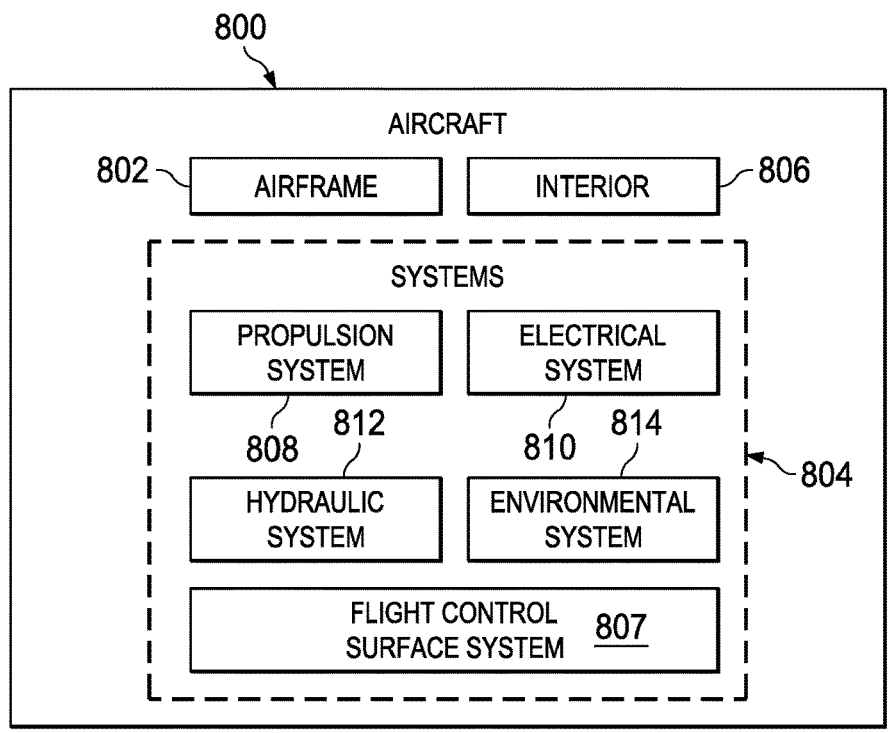
FIG. 8 is an illustration of a block diagram of an aircraft in which an illustrative embodiment may be implemented.

The illustrative embodiments of the present disclosure may be described in the context of aircraft manufacturing and service method 700 as shown in FIG. 7 and aircraft 800 as shown in FIG. 8. Turning first to FIG. 7, an illustration of a block diagram of an aircraft manufacturing and service method is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 in FIG. 8 takes place. Thereafter, aircraft 800 in FIG. 8 may go through certification and delivery 710 in order to be placed in service 712. While in service 712 by a customer, aircraft 800 in FIG. 8 is scheduled for routine maintenance and service 714, which may include modification, reconfiguration, refurbishment, and other maintenance or service.

Each of the processes of aircraft manufacturing and service method 700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of a block diagram of an aircraft is depicted in which an illustrative embodiment may be implemented. In this example, aircraft 800 is produced by aircraft manufacturing and service method 700 in FIG. 7 and may include airframe 802 with plurality of systems 804 and interior 806. Examples of systems 804 include one or more of flight control surface system 807, propulsion system 808, electrical system 810, hydraulic system 812, and environmental system 814. Any number of other systems may be included.

Although an aerospace example is shown, different illustrative embodiments may be applied to other industries, such as the automotive industry. Apparatuses and methods embodied herein may be employed during at least one of the stages of aircraft manufacturing and service method 700 in FIG. 7.

In one illustrative example, components or subassemblies produced in component and subassembly manufacturing 706 in FIG. 7 may be fabricated or manufactured in a manner similar to components or subassemblies produced while aircraft 800 is in service 712 in FIG. 7. As yet another example, one or more apparatus embodiments, method embodiments, or a combination thereof may be utilized during production stages, such as component and subassembly manufacturing 706 and system integration 708 in FIG. 7.

For example, control system 106 in FIG. 1 and control system 200 in FIG. 2 may be implemented in aircraft 800 during at least one of component and subassembly manufacturing 706 or system integration 708 to control different systems in systems 804. As depicted, control system 106 in FIG. 1 and control system 200 in FIG. 2 may be used to control at least one of flight control surface system 807, propulsion system 808, electrical system 810, hydraulic system 812, environmental system 814, or other systems for aircraft 800.

One or more apparatus embodiments, method embodiments, or a combination thereof may be utilized while aircraft 800 is in service 712, during maintenance and service 714 in FIG. 7, or both. The use of a number of the different illustrative embodiments may substantially expedite the assembly of aircraft 800, reduce the cost of aircraft 800, or both expedite the assembly of aircraft 800 and reduce the cost of aircraft 800. For example, control system 106 in FIG. 1 and control system 200 in FIG. 2 may operate while aircraft 800 is in service 712. Further, control system 106 in FIG. 1 and control system 200 in FIG. 2 may be added as new components or upgrades when aircraft 800 in FIG. 8 is scheduled for routine maintenance and service 714 in FIG. 7, which may include modification, reconfiguration, refurbishment, and other maintenance or service.

Thus, one or more illustrative examples provided a method and apparatus for managing a control system having a triple redundancy. In one illustrative example, a technical solution is present that provides a technical effect of managing a second lane failure. In one illustrative example, one technical solution utilizes a healthy lane to detect and report the occurrence of the second lane failure to a master controller, such as a flight control electronics system, and enables the flight control electronics system to shut down the actuator if such a fault is reported in the controller. In the illustrative example, power is removed from the remote electronic unit functioning as a controller as one example mechanism in which an actuator shutdown may be achieved.

In the illustrative example, data is transmitted out of one lane, the transmitting lane. This transmitting lane may be a second failed lane. The data is received by a master controller, such as a flight control electronics system. The analysis of the data sent by the transmitting lane is used by the flight control electronics system to determine whether a failure has occurred.

In the illustrative examples, the data includes at least one of an activity indicator, a status, and error checking data. This information may be used to protect against the case in which the transmitting lane, which is assumed to be healthy, becomes a failed lane.

For example, each lane generates a "status" which contains indications of whether an anomaly is seen by the lane. This status, along with other parameters, are sent to the transmitting lane. The transmitting lane transmits the information in one or more messages to the flight control electronics system.

If either of the remaining two lanes indicates an anomaly through the status, the flight control electronics system shuts down the actuator. The shutdown may be performed by removing electrical power from the controller for the actuator. In order to protect against the failed transmitting lane disrupting this communication path or corrupting the data, error checking data is included in the message. Thus, the flight control electronics system is able to detect whether the data path gets disrupted or the data has been corrupted.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. Although an illustrative example has been described with respect to a remote electronic unit that controls the flight control surface actuator based on commands from a flight control electronics system, other illustrative examples may be applied to other control systems. For example, another illustrative example may be applied to a controller controlling valves in a floodgate for a dam or some other type of triple redundant system in which availability is important.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a control system having triple redundancy for an aircraft, the method comprising:
   receiving a message from a transmitting lane in a controller including three lanes in which a first lane failure has previously occurred, wherein the message includes a first status and a first cyclic redundancy check value generated by the transmitting lane and a second status and a second cyclic redundancy check value generated by a second lane;
   identifying an activity indicator, the statuses generated by the transmitting lane and the second lane and the cyclic redundancy check values generated by the transmitting lane and the second lane in the message, wherein the cyclic redundancy check values generated by the transmitting lane and the second lane are generated using a key assigned to each lane; and
   disabling the controller when at least one of an anomaly is indicated in a status, an activity indicator mismatch is present, or a cyclic redundancy check value mismatch is present in the message that indicates a second dual lane failure has occurred.

2. The method of claim 1 further comprising:
   calculating a local cyclic redundancy check value for the message using the activity indicator, the status, and a local key for the lane in the group of lanes in the message.

3. The method of claim 1, wherein the disabling step comprises:
   removing power from the controller.

4. The method of claim 1 further comprising:
   generating the activity indicator; and
   sending the activity indicator to the controller.

5. The method of claim 1, wherein the cyclic redundancy check value is further based on the activity indicator and the status.

6. The method of claim 1, wherein the message is encrypted.

7. The method of claim 1, wherein the controller is a remote electronics unit.

8. The method of claim 1, wherein the receiving, identifying, and disabling steps are performed by a flight control electronics system.

9. The method of claim 1, wherein the controller controls at least one of an actuator, a valve, a servo, a flight control surface, an in-flight entertainment system, a fuel system, an engine, an environmental control system, an auto pilot, or a landing gear system.

10. The method of claim 1, wherein the anomaly is indicated in the status and is selected from at least one of a self-declaration of a failure by the transmitting lane, a failure of the second lane, or a release of a failed lane from a shutdown state.

11. A control system having triple redundancy for an aircraft, the control system comprising:
    a flight control electronics system configured to receive a message from a transmitting lane in a controller including three lanes in which a first lane failure has previously occurred, wherein the message includes a first status and a first cyclic redundancy check value generated by the transmitting lane and a second status and a second cyclic redundancy check value generated by a second lane; identify an activity indicator, the statuses generated by the transmitting lane and second lane, and the cyclic redundancy check values generated by the transmitting lane and second lane in the message, wherein the cyclic redundancy check value generated by a lane in the group of lanes is generated using a key assigned to the lane; and disable the controller when at least one of an anomaly is indicated in a status, an activity indicator mismatch is present, or a cyclic redundancy check value mismatch is present in the message that indicates a second lane failure has occurred.

12. The control system of claim 11, wherein the flight control electronics system is configured to calculate a local cyclic redundancy check value for the message using the activity indicator, the status, and a local key for the lane in the group of lanes in the message.

13. The control system of claim 11, wherein in disabling the controller, the flight control electronics system removes power from the controller.

14. The control system of claim 11, wherein the flight control electronics system generates the activity indicator and sends the activity indicator to the controller.

15. The control system of claim 11, wherein the cyclic redundancy check value is further based on the activity indicator and the status.

16. The control system of claim 11, wherein the message is encrypted.

17. The control system of claim 11, wherein the controller is a remote electronics unit.

18. The control system of claim 11, wherein the controller controls at least one of an actuator, a valve, a servo, a flight control surface, an in-flight entertainment system, a fuel system, an engine, an environmental control system, an auto pilot, or a landing gear system.

19. The control system of claim 11, wherein the anomaly is indicated in the status and is selected from at least one of a self-declaration of a failure by the transmitting lane, a failure of a second lane, or a release of a failed lane from a shutdown state.

20. A method for managing a control system for an aircraft, the method comprising:
    receiving a message at a flight control electronics system from a transmitting lane in a remote electronics unit including three lanes for triple redundancy in which a first lane failure has previously occurred, wherein the message includes a first status and a first cyclic redundancy check value generated by the transmitting and a second status and a second cyclic redundancy check value generated by a second lane;
    identifying, by the flight control electronics system, an activity indicator, the statuses generated by the transmitting lane and second lane, and the cyclic redundancy check values generated by the transmitting lane and the second lane in the message based on keys assigned to the transmitting lane and second lane; and
    performing, by the flight control electronics system, an action with respect to the remote electronics unit when at least one of an anomaly is indicated in a status, an activity indicator mismatch is present, or a cyclic redundancy check value mismatch is present in the message that indicates a second lane failure has occurred.

21. The method of claim 20, wherein the action is selected from one of disabling a controller, disabling a lane in the controller, activating another controller, and restarting the controller.

22. A method for managing a control system having triple redundancy for an aircraft, the method comprising:
- receiving a message from a transmitting lane in a controller including three lanes in which a first lane failure has previously occurred, wherein the message includes a first status and first error checking data mismatch generated by the transmitting lane and a second status and second error checking data mismatch generated by a second lane;
- identifying an activity indicator and the error checking data mismatches generated by the transmitting lane and the second lane in the message based on a group of keys assigned to the transmitting lane and the second lane; and
- disabling the controller when at least one of an anomaly is indicated in a status, an activity indicator mismatch is present, or an error checking data mismatch is present in the message that indicates a second lane failure has occurred.

* * * * *